United States Patent [19]

Gardner et al.

[11] Patent Number: 5,370,402
[45] Date of Patent: Dec. 6, 1994

[54] PRESSURE BALANCED COMPLIANT SEAL DEVICE

[75] Inventors: James F. Gardner, Exeter; Hai-Ping Ma, Lincoln, both of R.I.

[73] Assignee: EG&G Sealol, Inc., Granston, R.I.

[21] Appl. No.: 57,888

[22] Filed: May 7, 1993

[51] Int. Cl.$^5$ .......................................... F16J 15/447
[52] U.S. Cl. ........................................ 277/27; 277/53; 277/173; 277/192
[58] Field of Search ................ 277/3, 27, 53, 57, 173, 277/174, 175, 176, 192, 199, 212 F, 236; 215/61.1; 137/855

[56] References Cited

U.S. PATENT DOCUMENTS

| | | |
|---|---|---|
| 4,042,248 | 8/1977 | Williamitis . |
| 4,398,725 | 8/1983 | Maegawa . |
| 5,100,158 | 3/1992 | Gardner . |
| 5,221,096 | 6/1993 | Heldreth et al. . |

FOREIGN PATENT DOCUMENTS

| | | | |
|---|---|---|---|
| 1469436 | 2/1967 | France | 277/173 |
| 10133 | 1/1980 | Japan | 277/53 |
| 257330 | 8/1926 | United Kingdom | 277/53 |
| 811602 | 4/1959 | United Kingdom | 277/53 |
| 1218225 | 3/1986 | U.S.S.R. | 277/53 |

OTHER PUBLICATIONS

J. Gardner et al., "A New Compliant Seal Concept for Aerospace Applications," presented and published in the Proceedings of the Fourth International Symposium on Transport Phenomena and Dynamics of Rotating Machinery (ISROMAC-4) Honolulu, Hi., Apr. 5–8, 1992, pp. 593–612.

*Primary Examiner*—Scott W. Cummings
*Attorney, Agent, or Firm*—Finnegan, Henderson, Farabow, Garrett & Dunner

[57] ABSTRACT

A compliant seal device for sealing a high pressure area from a low pressure area. The compliant seal device comprises a base member including an annular base wall, a first wall extending radially inward from the base wall proximate the high pressure area and a second wall extending radially inward from the base wall proximate the low pressure area, the base member having a cavity formed therein between the first wall and the second wall. The compliant seal device further comprises a plurality of flexible sheet members extending between the first wall and the second wall, each of the plurality of flexible sheet members having a base end fixed to the first wall and a moveable free end in sealing engagement with the second wall to substantially enclose the cavity with an adjustable pressure therein.

38 Claims, 10 Drawing Sheets

PRESSURE BALANCED COMPLIANT SEAL DEVICE

BACKGROUND OF THE INVENTION

1. Field of the Invention

The present invention relates to gas or liquid seals and, more specifically, to gas or liquid compliant seals for sealing high pressure areas from low pressure areas.

2. Description of the Related Art

Many classes of machinery use clearance seals to contain a gas under pressure. Often these seals are simple labyrinth seals which break down pressure by using a series of teeth or blades in close proximity to a rotating shaft. Such devices are well known and reliable, but allow high rates of gas leakage. Typically, clearances between the blade tips of a labyrinth seal and the shaft are as high as 0.001–0.002 inches per inch of shaft diameter.

Much work has been done to reduce the leakage of labyrinth seals. Typically, the approach of past efforts has been directed toward improved blade geometry (e.g., backward angled blade designs), step seals, or interlocking blade designs to reduce losses. Abradable labyrinth seal designs have also been developed and are employed, particularly, on jet engines. The blades of such abradable seals are initially installed with a line-to-line clearance, and then wear in to their own clearance as the machine rotates. However, after the rotor has gone through an operating history of radial vibration combined with axial excursions, a crescent-shaped clearance is often cut into the abradable seal, and leakage can increase dramatically. In spite of many improved designs, therefore, leakage losses for labyrinth seals continue to represent a considerable energy loss in rotating machinery.

Another significant problem with high pressure labyrinth seals is the occurrence of rotordynamic effects. Since high pressure gas is quite dense, a labyrinth seal begins to act as a bearing with high gas pressures, but tends to destabilize the rotor due to a lack of concentricity with the actual machine bearings. Significant effort has been made recently to decrease rotordynamic excitation effects. The product of these efforts includes swirl breaks in front of a labyrinth, reverse swirl inducers, and injecting tangentially non-moving gas into the first stagnant region of the labyrinth. Other work has been concentrated on optimized geometry and creating a rough surface within the labyrinth seal to retard circumferential gas velocity buildup. Also, honeycomb design labyrinth seals have been developed to reduce rotordynamic excitation effects. However, further reduction of rotordynamic effects is needed.

As an alternative to the labyrinth seal, applicant has proposed a seal having compliant fingers which ride upon a thin gas or liquid film between the fingers and a rotating shaft. Such a compliant finger seal is disclosed in U.S. Pat. No. 5,100,158.

SUMMARY OF THE INVENTION

Features and advantages of the invention will be set forth in part in the description which follows, and in part will be obvious from the description, or may be learned by practice of the invention. The objects and other advantages of the invention may be realized and attained by the apparatus particularly pointed out in the written description, claims and appended drawings.

To achieve these and other advantages, and in accordance with the purposes of the invention as embodied and broadly described herein, a compliant seal device for sealing a high pressure area from a low pressure area is provided comprising a base member including a base wall, a first wall extending from the base wall proximate the high pressure area and a second wall extending from the base wall proximate the low pressure area, the base member having a cavity formed therein between the first wall and the second wall; and a flexible sheet member extending between the first wall and the second wall, the flexible sheet member having a base end fixed to the first wall and a moveable free end in sealing engagement with the second wall to substantially enclose the cavity with an adjustable pressure therein.

In one aspect of the invention, the free end of the sheet member includes a flange for sealing engagement with an inner surface of the second wall, the inner surface of the second wall includes a secondary sealing element for sealing engagement with the flange, and the flexible sheet member has a bend in a direction towards the cavity.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate several embodiments of the invention and together with the description serve to explain the principles of the invention. In the drawings.

DETAILED DESCRIPTION OF THE INVENTION

Reference will now be made in detail to the presently preferred embodiments of the invention, as illustrated in the accompanying drawings, in which like reference characters designate like or corresponding parts throughout the several drawings.

Figure 1:
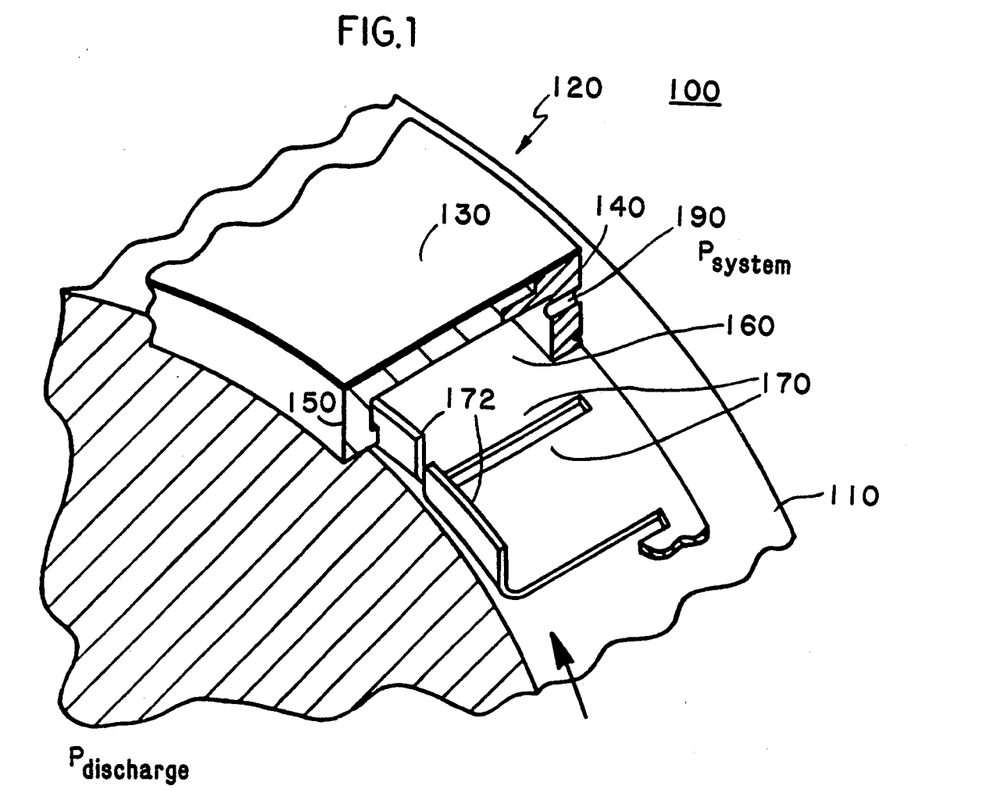
FIG. 1 is a perspective view of a compliant seal device in accordance with a first embodiment of the invention.
Figure 2:
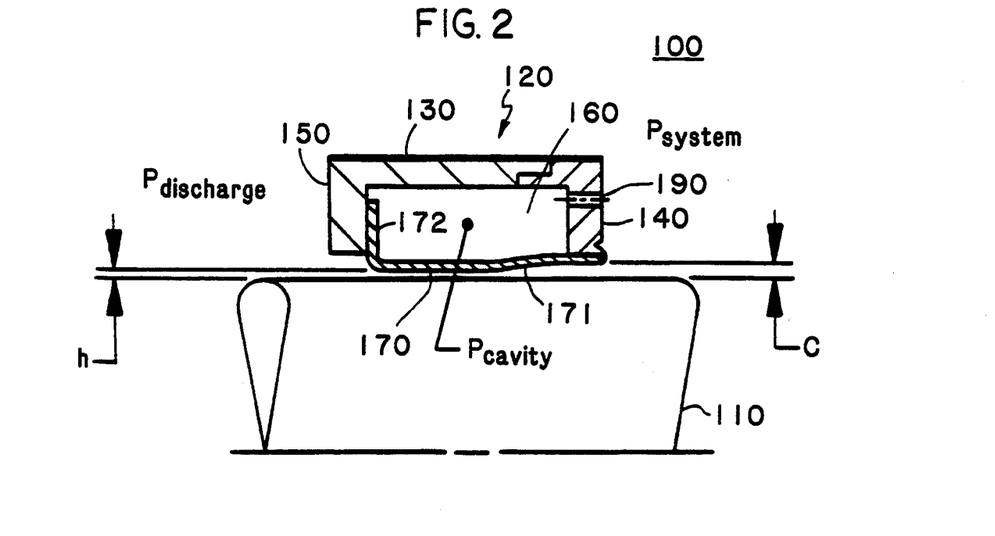
FIG. 2 is a side view of half of the compliant seal device of FIG. 1.

A first embodiment of the invention will now be described with reference to FIGS. 1 and 2. As shown in FIGS. 1 and 2, a compliant seal device 100 is provided for inhibiting the flow of a gas (or liquid) in a stream along a shaft 110. The gas (or liquid) is sealed, for example, within a machine housing (not shown) and has a system pressure of Psystem. The area outside of the sealed machine housing toward which the sealed gas will tend to leak has a discharge pressure Pdischarge, the system pressure Psystem being greater than the discharge pressure Pdischarge.

The compliant seal device 100 comprises a base member 120 including an annular base wall 130, a first wall 140 extending radially inward from the base wall 130 proximate the system pressure Psystem and a second wall 150 extending radially inward from the base wall 130 proximate the discharge pressure Pdischarge. The base member 120 further has a cavity 160 formed therein between the first wall 140 and the second wall 150. The base member 120 is removably attached to the machine housing (not shown), as is known to one skilled in the art.

Preferably, the base member 120 comprises a material having a high yield strength at high temperatures. For example, the base member 120 can comprise a nickel based alloy such as Inconel ® manufactured by Inco Alloys International. It should be understood that the composition of the base member 120 cart be varied depending on the particular application with which the compliant seal device 100 is to be used.

The compliant seal device 100 further comprises a plurality of flexible sheet members 170 extending between the first wall 140 and the second wall 150 of the base member 120. Each of the plurality of flexible sheet members 170 has a base end fixed to the first wall 140 by welding or other means known in the art, and a moveable free end in sealing engagement with the second wall 150 to substantially enclose the cavity 160 with an adjustable pressure Pcavity therein. The base ends of the flexible sheet members 170 are preferably displaced from the shaft 110 by a clearance c. Further, the flexible sheet members 170 preferably have a bend 171 to bias their free ends towards the shaft 110. It is contemplated that the flexible sheet members 170 can have other means to bias their free ends toward the shaft 110 as is known to one skilled in the art.

Preferably, the cavity pressure Pcavity is slightly reduced with respect to the system pressure Psystem. Typical values of the cavity pressure Pcavity are about 80-90 percent of that of the system pressure Psystem. As will be explained in more detail below, a nominal force balance is thus achieved in the radial direction of the compliant seal device 100.

It is contemplated that the cavity pressure Pcavity can be fine tuned, i.e., either raised or lowered, as required, by the use of one or more through ports. For example, to raise the cavity pressure Pcavity to, for example, compensate for leakage through the flexible sheet members 170, the compliant seal device 100 can comprise a through port 190 in communication with the cavity 160 and the system pressure Psystem. Likewise, to lower the cavity pressure Pcavity, the compliant seal device 100 can comprise a through port (not shown) in communication with the cavity 160 and the discharge pressure Pdischarge. It should be appreciated that the flow through these through ports is very small, as compared with a standard labyrinth seal design.

Although the free ends of the flexible sheet members 170 can be in sealing engagement with the second side 150 of the base member 120 at, for example, an inner peripheral surface of the second side 150, each of the free ends preferably includes a flange 172 for sealing engagement with an inner surface of the second wall 150. To reduce friction between the flanges 172 and the inner surface of the second wall 150, a lubricant (not shown) such as a TFE, graphite, molydisulfide carbon, or chrome carbide with a solid lubricant can be applied to the flanges 172 and/or the inner surface of the second wall 150.

As shown in FIG. 1, the flexible sheet members 170 are annually positioned around the shaft 110 circumferentially spaced from each other and, as explained above, preferably extend toward contact with the shaft 110 at their free ends. To reduce friction between the flexible sheet members 170 and the shaft 110 should they come in contact, a lubricant (not shown) such as a TFE, graphite, molydisulfide carbon, or chrome carbide with a solid lubricant can be applied to the shaft 110 and/or the flexible sheet members 170.

As will be explained in more detail below, during rotation of the shaft 110, the flexible sheet members 170 actually "ride" upon a thin film of gas (or liquid) with a clearance h above the surface of the shaft 100. As will also be explained in more detail below, with certain modifications, the flexible sheet members 170 can also "ride" above the surface of the shaft 110 during non-rotating conditions.

Preferably, the flexible sheet members 170 comprise a material having a high yield strength at high temperatures. For example, the flexible sheet members 170 can comprise a nickel based alloy such as Inconel ®. Again, it should be understood that the composition of the flexible sheet members 170 can be varied depending on the particular application with which the compliant seal device 100 is to be used.

The flexible sheet members 170 can be about 0.003-0.012 inch thick, and are preferably 0.004-0.008 inch thick. Further, the flexible sheet members 170 are preferably sized to optimize their hydrostatic and hydrodynamic characteristics. Currently, for a 4.750 inch shaft and a differential pressure of 60 psi, seals are being tested with a design clearance h of 0.0002-0.0005 inch between the flexible sheet members 170 and the shaft 110, and with the flexible sheet members 170 being 0.332 inch wide and being circumferentially spaced 0.006–0.008 inch from each other.

Figure 3A:
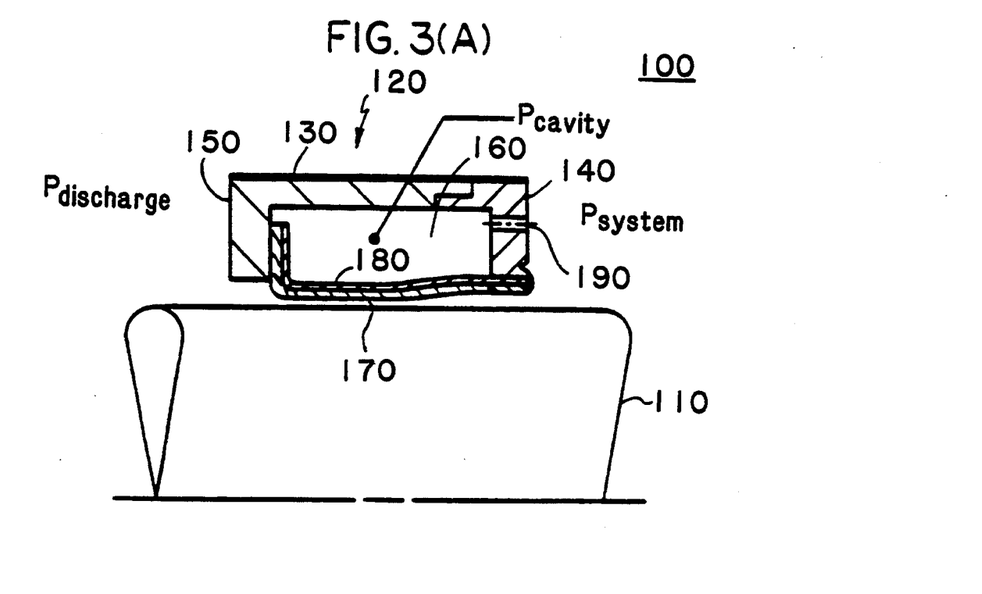
FIG. 3(A) is a side view of half of the compliant seal device of FIGS. 1 and 2 having a gap cover between the flexible sheet members.
Figure 3B:
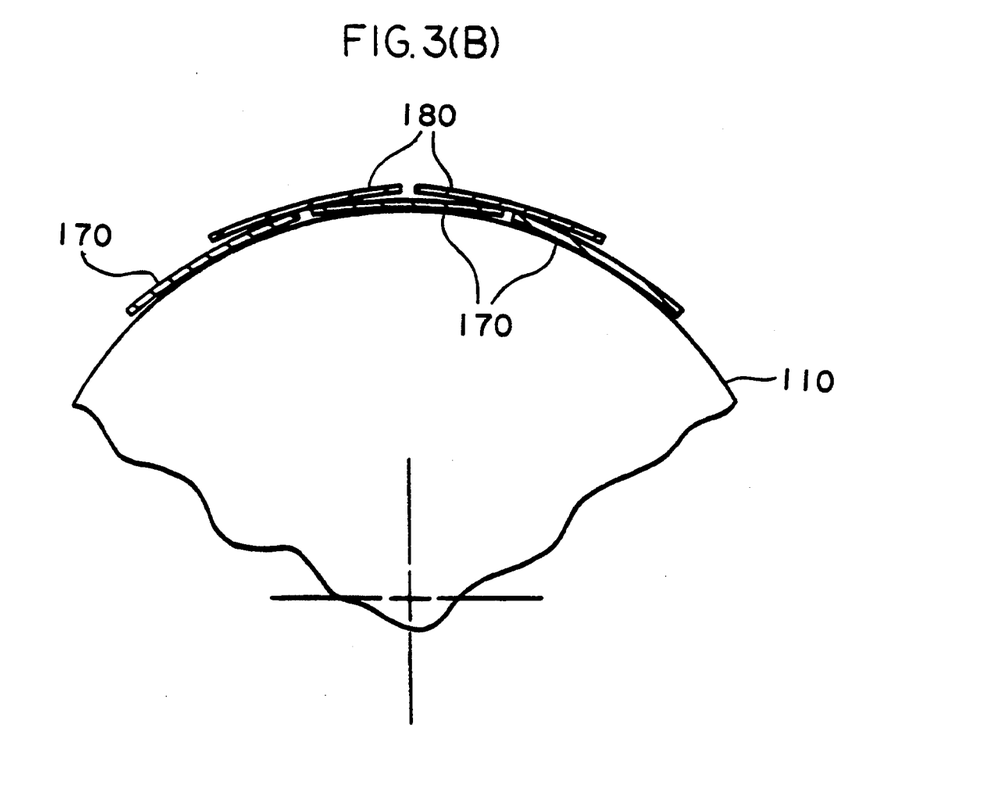
FIG. 3(B) is an end view of the compliant seal device of FIG. 3(A)

It should be noted that some gas flow occurs through the circumferential spaces between the flexible sheet members 170. Although this gas flow is relatively small, it may be preferable under certain circumstances to provide a gap cover for sealing the spaces between the flexible sheet members 170. Such a gap cover is depicted in FIGS. 3(A) and 3(B) as strips 180 provided to seal across the circumferential spacings between the flexible sheet members 170. Preferably, the strips 180 have a lighter construction than the flexible sheet members 170 and are made of the same material as the flexible sheet members 170. However, it should be noted that the strips 180 can be made of other materials such as different alloys. Further, the strips 180 are preferably thinner than the flexible sheet members 170. The strips 180 may also be attached to the base member 120 by welding or other means known in the art.

In accordance with the invention, each of the flexible sheet members 170 of the compliant seal device 100 includes means, responsive to rotation of the shaft 110, for lifting the flexible sheet members 170 away from the shaft 110. As shown in FIG. 3(B) by way of example and not limitation, this lifting means is represented by a curvature of the flexible sheet members 170 in the same direction as the curvature of the shaft 110, wherein the radius of curvature of the flexible sheet members 170 is preferably greater than the radius of the curvature of the shaft 110.

During rotation of the shaft 110, the curvature mismatch create a hydrodynamic lift-off action due to viscous effects of the gas (or liquid). Under rotating conditions, the lifting means captures gas (or liquid) so that the pressure under the flexible sheet members 170 increases causing the flexible sheet members 170 to bend, and lift-off to occur. The flexible sheet members 170 will ride upon a thin film of gas (or liquid) between the flexible sheet members 170 and the shaft 110, thereby making the flexible sheet members 170 compliant to tolerances in the surface of the shaft 110 and differential thermal and centrifugal growth of the shaft 110, as well as variations in the concentricity between the shaft 110 and seal bores (not shown) and rotational runout of the shaft 110. As the flexible sheet members 170 lift off, they will also twist slightly, as shown by FIG. 5(B), so that their leading edges will operate at a larger clearance than their trailing edges. Typical operating clearances at the leading edges of the flexible sheet members 170 are on the order of 0.0003–0.0007 inch, while typical clearances at the trailing edges are 0.0001–0.0002 inch.

Figure 4A:
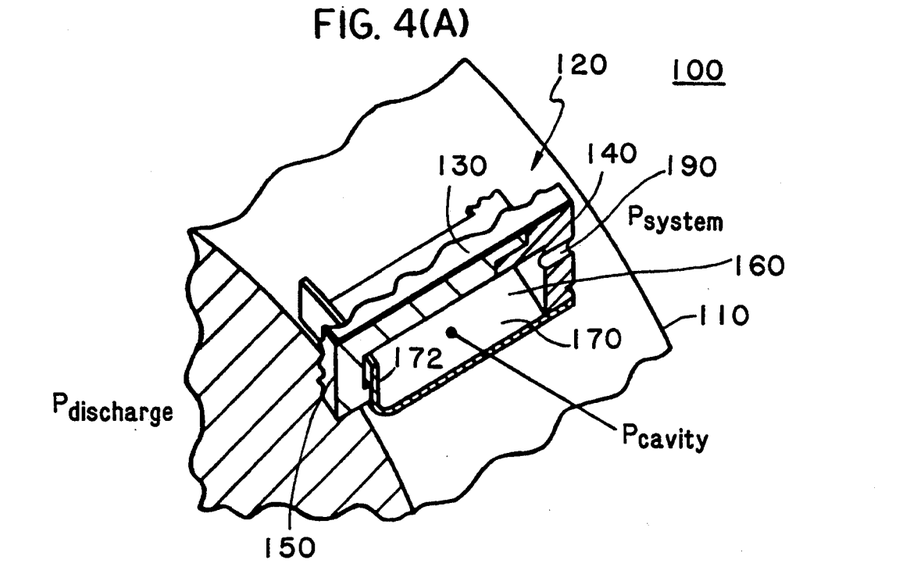
FIGS. 4(A), 4(B) and 4(C) are a perspective view, a pressure distribution diagram and flow diagram, respectively, of a flexible sheet member of the compliant seal device of FIGS. 1 and 2.
Figure 4B:
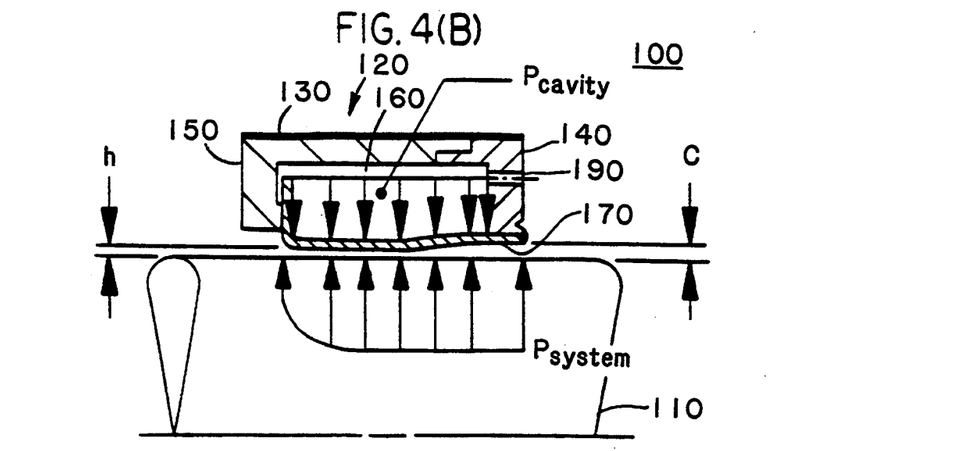
Figure 4C:
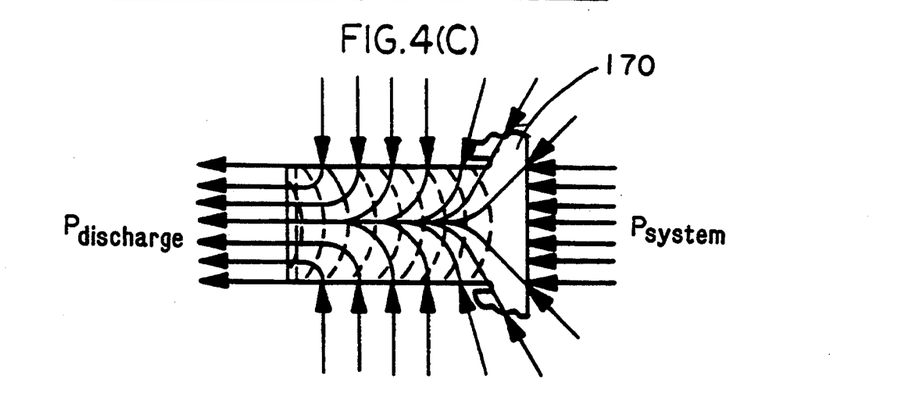

A typical one of flexible sheet members 170 is shown in FIGS. 4(A), 4(B) and 4(C). For such a flexible sheet member, the pressure distribution during non-rotating conditions is shown in FIGS. 4(B) and 4(C). In FIG. 4(C), the solid lines represent the direction of the flow field of the gas (or liquid), and the dotted lines represent lines of constant pressure between the shaft 110 and the underside of the flexible sheet member 170.

Figure 5A:
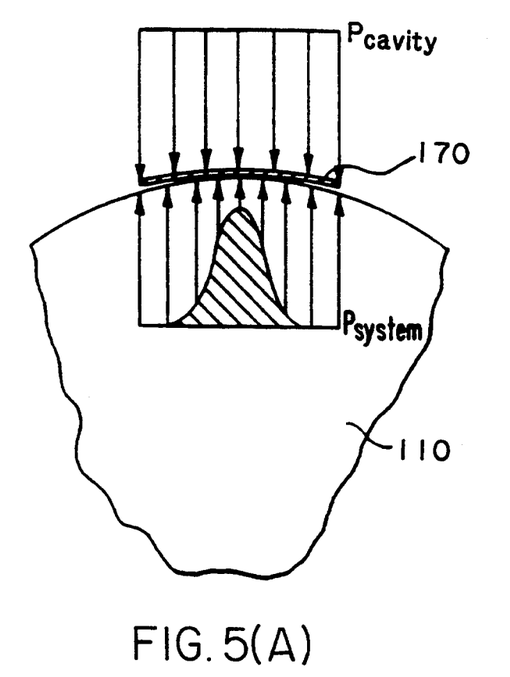
FIGS. 5(A) and 5(B) are pressure distribution diagrams of a flexible sheet member during non-rotation and rotation of the shaft, respectively, of the compliant seal device of FIGS. 1 and 2.
Figure 5B:
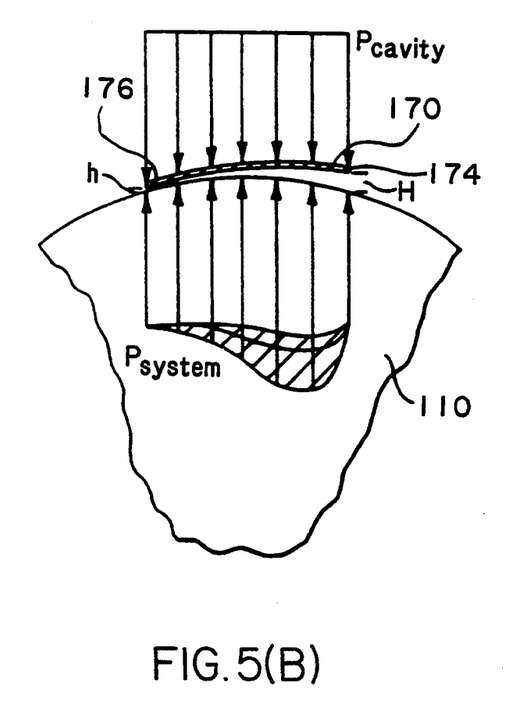

FIG. 5(A) shows a typical pressure profile through the central section of an individual one of the flexible sheet members 170 during stationary shaft conditions. As shown in FIG. 5(A), during non-rotating conditions, the pressure in the cavity Pcavity above the flexible sheet member 170 is slightly less than the pressure between the shaft 110 and the flexible sheet member 170. Therefore, the flexible sheet member 170 is only very lightly pressed down upon the surface of the shaft 110 during non-rotating conditions.

FIG. 5(B) shows a typical pressure distribution through the same section of the flexible sheet member 170 shown in FIG. 5(A) as the shaft 110 rotates. At the edge of the flexible sheet member 170, pressure is equal to the local pressure in the space between the flexible sheet members 170. Between the flexible sheet member 170 and the shaft 100, however, pressure builds up because of viscous hydrodynamic effects. A typical pressure distribution under a rotating condition shows that the pressure radially inside the flexible sheet member 170 is greater than the pressure radially outside the flexible sheet member 170 and the flexible sheet member 170 thus lifts from the shaft 110. As can be seen in FIG. 5(B), the pressure under the leading edge 174 of the flexible sheet member 170 is greater than that under the trailing edge 176. Thus, the clearance H between the shaft 110 and the leading edge 174 is greater than the clearance h at the trailing edge 176.

Figure 6:
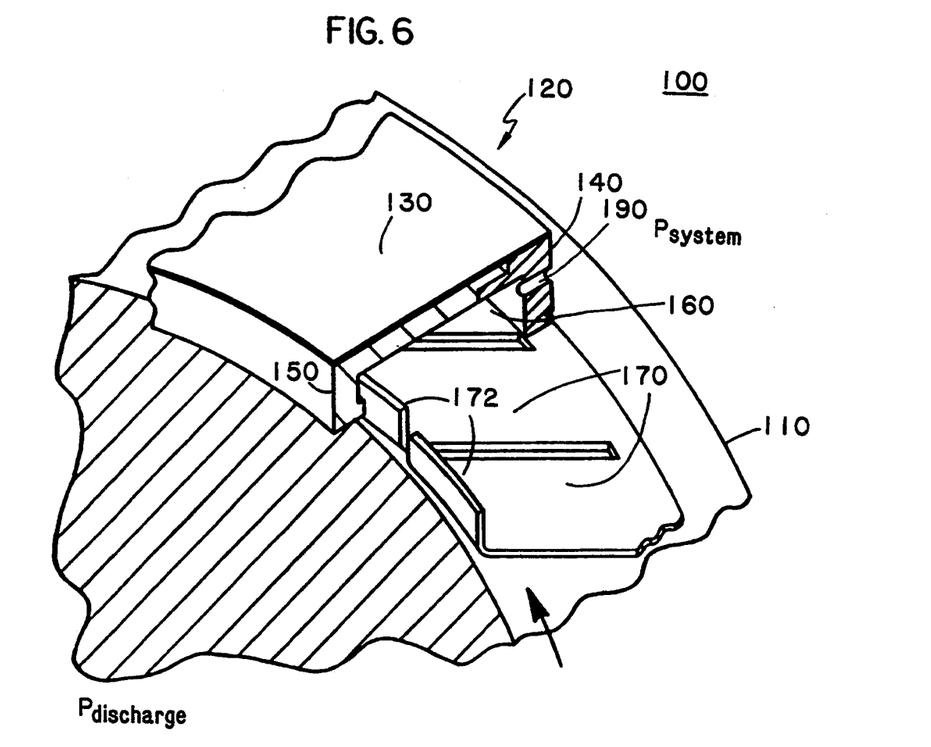
FIG. 6 is a perspective view of the compliant seal device of FIGS. 1 and 2 having angled flexible sheet members.

As shown in FIG. 6, to augment the lift-off for a preferred direction of rotation of the shaft 110, the flexible sheet members 170 can be arranged such that their elongated axis is angled with respect to the axis of the compliant seal device 100 (or the shaft 110) and such that their free ends face away from the direction of rotation of the shaft 110. As the shaft 110 rotates, the angling causes capture of gas (or liquid) not only from the free ends of the flexible sheet members 170, but also from the fact that the flexible sheet members 170 are partially wrapped over the diameter of the shaft 110, and act like "foil bearings." The increased pressure causes additional lift-off and clearance of the flexible sheet members 170 from the shaft 110.

Figure 7A:
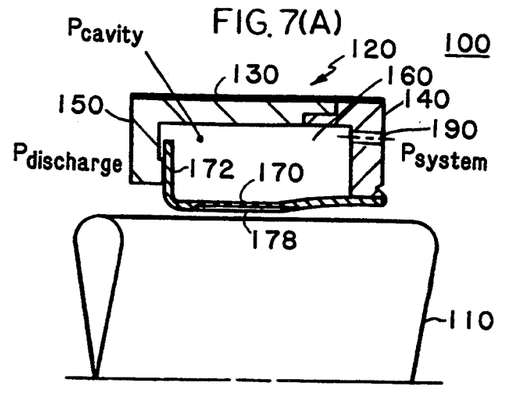
FIGS. 7(A), 7(B) and 7(C) depict the compliant seal device of FIGS. 1 and 2 with recesses formed in the lower sides of the flexible sheet members.

As shown in FIG. 7(A), to further augment the lift-off for a preferred direction of rotation of the shaft 110, each of the flexible sheet members 170 can include a recess 178 formed on its lower side proximate the shaft 110. The recesses 178 can comprise any one of an open Rayleigh pad, a closed Rayleigh pad, a shrouded Rayleigh pad, and a radial, spiral or angled groove. Alternative designs for the recesses 178 can also be utilized as is known in the art. Further, the recesses 178 can be chemically milled, ion etched or made by other means known in the art.

Figure 7B:
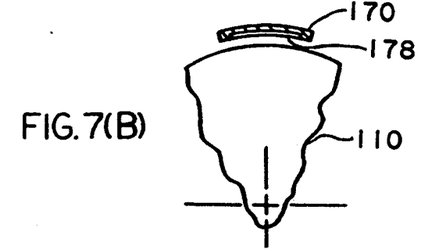

It should be appreciated that this configuration increases the pressure range of the compliant seal device 100 by at least partially pressure balancing the recesses 178 and increases lift-off by incorporating step bearing principles similar to Rayleigh pad designs on face seals. It should also be appreciated that with this configuration, it is possible to provide hydrostatic lift-off under the recesses 178 by slightly lowering the cavity pressure Pcavity. Accordingly, a clearance between the flexible sheet members 170 and the shaft 110 can be present even under non-rotating conditions. Because the recesses 178 provide hydrodynamic lift, a mismatch in curvature between the shaft 110 and the flexible sheet members 170 is not necessarily required for hydrodynamic lift-off. Therefore, with this configuration, the flexible sheet members 170 and the shaft 110 can have the same radius of curvature. Nevertheless, each of the flexible sheet members 170 may have both a recess and a mismatch in curvature with the shaft 110, as shown in FIG. 7(B).

Figure 7C:
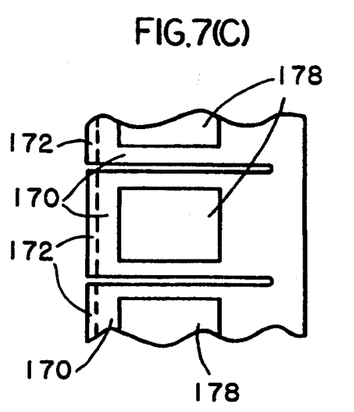

As shown in FIG. 7(C), a recess 178 according to the invention is typically 0.0002–0.0007 inch deep in a 0.004–0.008 inch thick metallic flexible sheet member 170. Preferably, the recess 178 extends to a point along the flexible sheet member 170 just before the flange 172 to allow the system pressure Psystem to enter underneath the end of the flexible sheet member 170, thereby creating a hydrostatic balancing force which creates an additional lifting force.

Figure 8A:
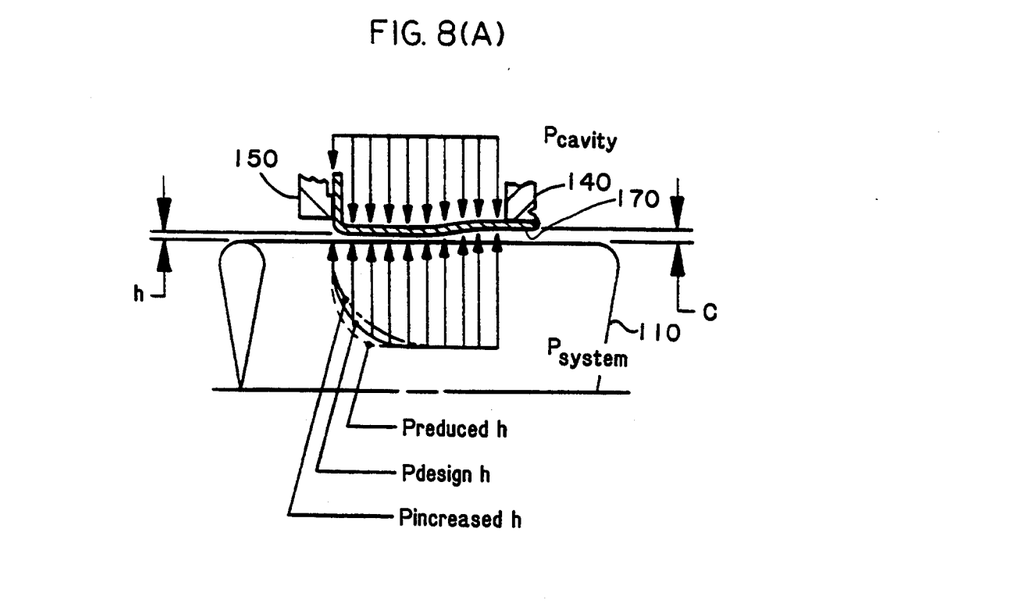
FIG. 8(A) is a force distribution diagram of the compliant seal device of FIGS. 1 and 2.

FIG. 8(A) is a typical force distribution diagram for a single one of the flexible sheet members 170 of the compliant seal device 100 of FIGS. 1 and 2. Pdesign shows the pressure distribution for a design clearance h for which a nominal force balance is designed. If the shaft 110 moves so as to decrease the design clearance h, the pressure distribution under the flexible sheet member 170 changes as shown by Preduced, and the total force under the flexible sheet member 170 increases. Conversely, if the shaft 110 moves so as to increase the design clearance h, the pressure distribution changes as shown by Pincreased, and the total force under the flexible sheet member 170 decreases. Thus, the cavity 60 with the adjustable pressure Pcavity therein serve to hydrostatically balance the flexible sheet members 170. It should be appreciated that the principle of hydrostatic balance used for this design is much the same as for hydrostatically balanced gas face seals.

Similarly, hydrodynamic force increases are expected at operating conditions, much as the way in which spiral grooves work on a gas face seal. It should also be appreciated that once a nominal force balance is achieved, the fast response action of the recesses 178 can come into play, as discussed above. Thus, when the shaft 110 rotates, the recesses 178 formed in the flexible sheet members 170 create additional force, slightly increasing the operating film height. Although this may slightly increase leakage, it gives rise to a much higher film stiffness.

It should be noted that in order to generate hydrodynamic lift-off of the flexible sheet member 170 during rotating conditions, it is desired that under static conditions, the flexible sheet member 170 lie very close, e.g., 0.000025–0.000100 inch, to the surface of the shaft 110. In this manner, the hydrodynamic forces can be fully developed underneath the flexible sheet member 170. However, because the first point of contact between the flexible sheet member 170 and the shaft 110 during non-rotating conditions is at the most flexible point of the flexible sheet member 170, namely, the point just before the flange 172, the compliant seal device 100 behaves like a tip seal whenever shaft run out occurs. This not only provides for unstable hydrodynamic lift-off conditions which increase leakage of the compliant seal device 100, but also prevents the compliant seal device 100 from accommodating large excursions of the shaft 110.

Figure 8B:
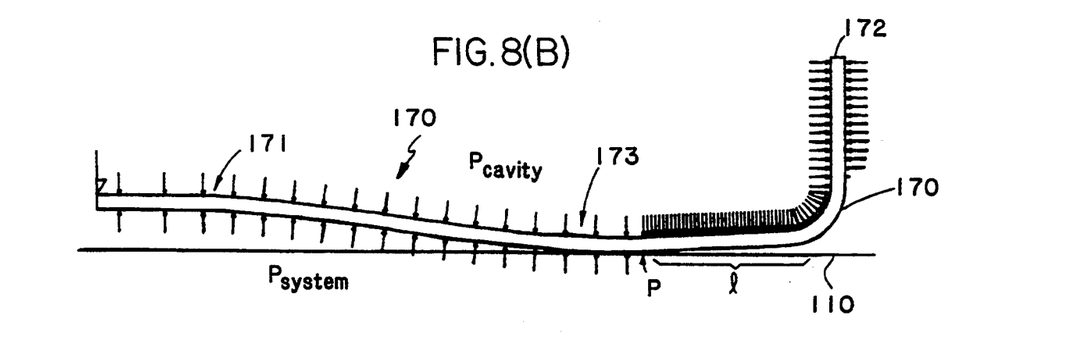
FIG. 8(B) shows the preferred shape of a flexible sheet member having a bend in a direction towards a cavity.

Accordingly, as shown in FIG. 8(B), the flexible sheet member 170 preferably has a bend 173 in a direction toward the cavity 160 such that the first point of contact p of the flexible sheet member 170 with the shaft 110 is away from the flange 172. Preferably, the point p is located about ⅔ the length of the flexible sheet member 170. By locating the point p away from the flange 172, a length l of the flexible sheet member 170 can be in contact with the surface of the shaft 110 during non-rotating conditions because of the lack of any pressure forces underneath the flexible sheet member 170 along the length l. It should be understood that FIG. 8(B) shows the flexible sheet member 170 as manufactured, and when the point p first contacts the shaft 110. Pressure in the cavity 160 over the length l will then cause the length l to lay down on the shaft 110.

Figure 8C:
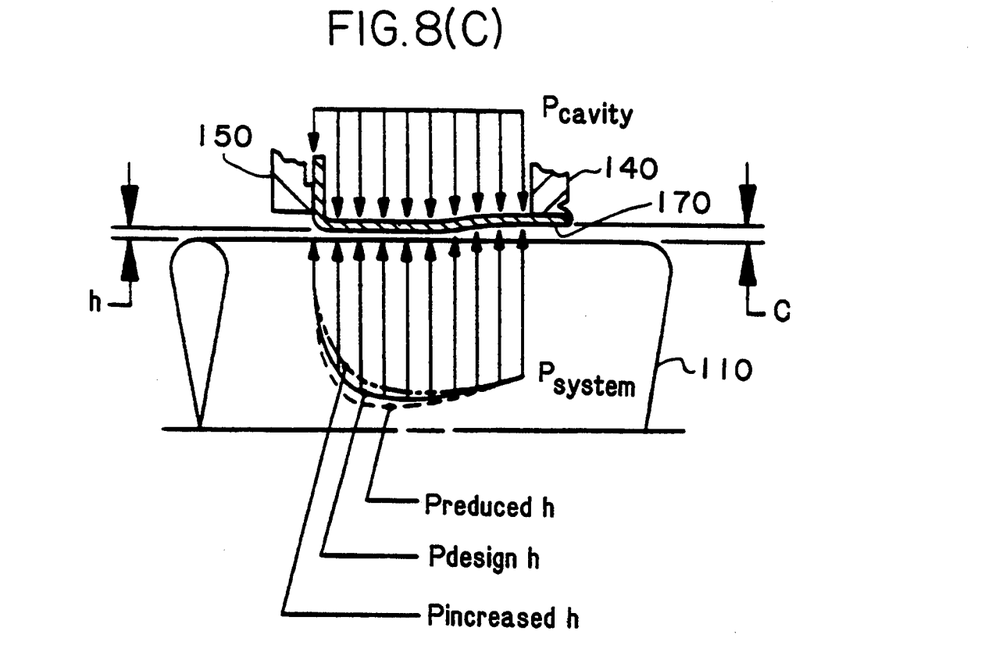
FIG. 8(C) is a pressure distribution diagram of the compliant seal device of FIGS. 1 and 2 having the flexible sheet member of FIG. 8(B)

It should be appreciated that with this design, the compliant seal device 100 has good contact with the surface of the shaft 110 during non-rotating conditions regardless of the system pressure Psystem. Moreover, with this design, the compliant seal device 100 can handle relatively large shaft excursions, e.g., 0.035 inch, and the hydrodynamic lift-off forces are no longer concentrated at a single point but, instead, are spread over the length l of the flexible sheet member 170, as shown by FIGS. 8(C).

Figure 9:
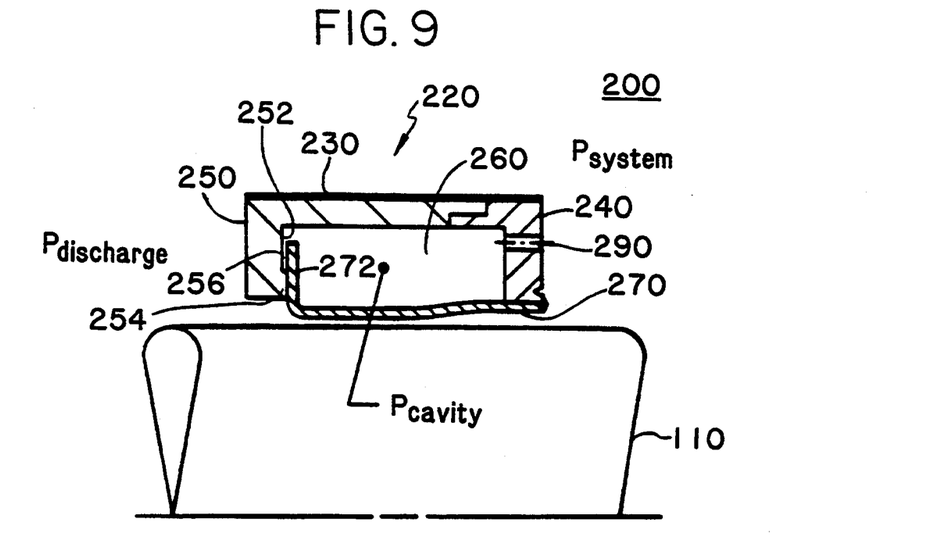
FIG. 9 is a side view of half of a compliant seal device including a base member with a second wall having a dam member protruding therefrom according to a second embodiment of the invention.

A second embodiment of the invention will now be described with reference to FIG. 9. As shown in FIG. 9, a compliant seal device 200 is provided comprising a base member 220, the base member 220 including an annular base wall 230, a first wall 240 extending radially inward from the base wall 230 proximate a system pressure Psystem and a second wall 250 extending radially inward from the base wall 230 proximate a discharge pressure Pdischarge. The base member 220 further includes a cavity 260 formed therein between the first wall 240 and the second wall 250.

The compliant seal device 200 further comprises a plurality of flexible sheet members 270 extending between the first wall 240 and the second wall 250. Each of the plurality of flexible sheet members 270 has a base end fixed to the first wall 240 and a flange 272 in sealing engagement with the second wall 250 to substantially enclose the cavity 260 with an adjustable pressure Pcavity therein. As in the first embodiment, the cavity pressure Pcavity can be fine tuned by the use of a through port 290 in communication with the cavity 260 and the system pressure Psystem, or a through port (not shown) in communication with the cavity 260 and the discharge pressure Pdischarge.

Preferably, the compliant seal device 200 is the same as the compliant seal device 100 of FIG. 2 except that the inner surface 252 of the second wall 250 includes a dam member 254 protruding therefrom. The dam member 254 defines a space 256 between the flanges 272 of the flexible sheet members 270 and the inner surface 252 of the second wall 250 to maintain a pressure balance on opposite sides of the flanges 272. It should be appreciated that with this design, the frictional forces between the second wall 250 and the flanges 272 can be reduced. Further, the dam member 254 serves to protect the flexible sheet members 270, for example, during assembly of the compliant seal device 200.

Figure 10:
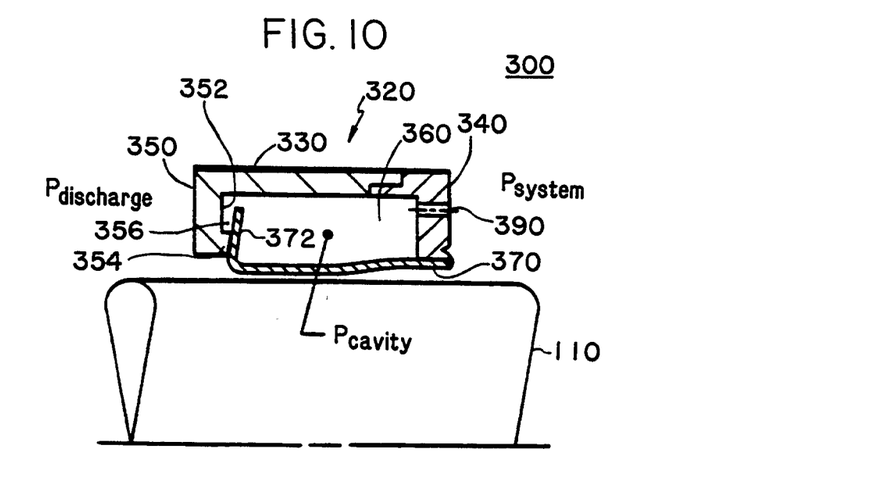
FIG. 10 is a side view of half of a compliant seal device including a base member with a second wall having a dam member protruding therefrom, the dam member having an angled inner surface according to a third embodiment of the invention.

A third embodiment of the invention will now be described with reference to FIG. 10. As shown in FIG. 10, a compliant seal device 300 is provided comprising a base member 320, the base member 320 including an annular base wall 330, a first wall 340 extending radially inward from the base wall 330 proximate a system pressure Psystem and a second wall 350 extending radially inward from the base wall 330 proximate a discharge pressure Pdischarge. The base member 320 further includes a cavity 360 formed therein between the first wall 340 and the second wall 350.

The compliant seal device 300 further comprises a plurality of flexible sheet members 370 extending between the first wall 340 and the second wall 350. Each of the plurality of flexible sheet members 370 has a base end fixed to the first wall 340 and a flange 372 in sealing engagement with the second wall 350 to substantially enclose the cavity 360 with an adjustable pressure Pcavity therein. As in the first embodiment, the cavity pressure Pcavity can be fine tuned by the use of a through port 390 in communication with the cavity 360 and the system pressure Psystem, or a through port (not shown) in communication with the cavity 360 and the discharge pressure Pdischarge. The compliant seal device 300, like the compliant seal device 200 of FIG. 9, includes a dam member 354 protruding therefrom. The dam member 354 defines a space 356 between the flanges 372 of the flexible sheet members 370 and the inner surface 352 of the second wall 350 to maintain a pressure balance on opposite sides of the flanges 372.

Preferably, the compliant seal device 300 is the same as the compliant seal device 200 of FIG. 9 except that an inner surface of the dam member 354 is angled for selective engagement with the flanges 372 of the flexible sheet members 370 as the free ends of the flexible sheet members 370 move. It should be appreciated that with this design, the angled inner surface approximates a spherical surface thereby minimizing the friction forces generated at the interface between the flanges 372 and the second wall 350.

Figure 11A:
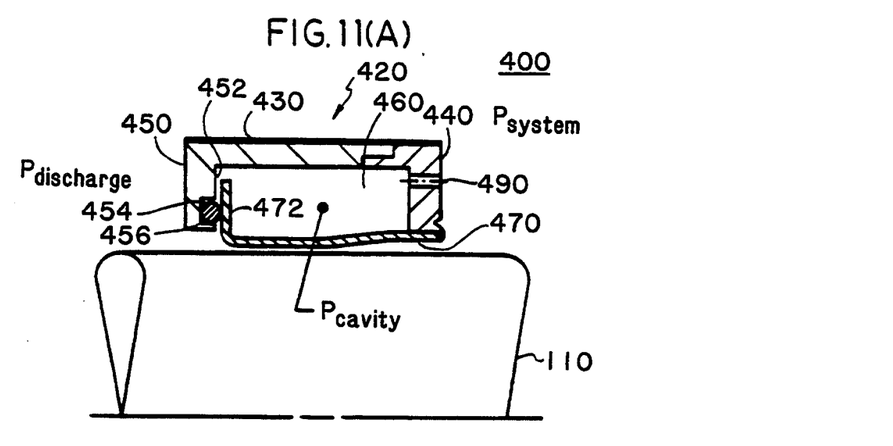
FIGS. 11(A) and 11(B) are side views of half of a compliant seal device including a base member with a second wall having a secondary sealing element according to a fourth embodiment of the invention.
Figure 11B:
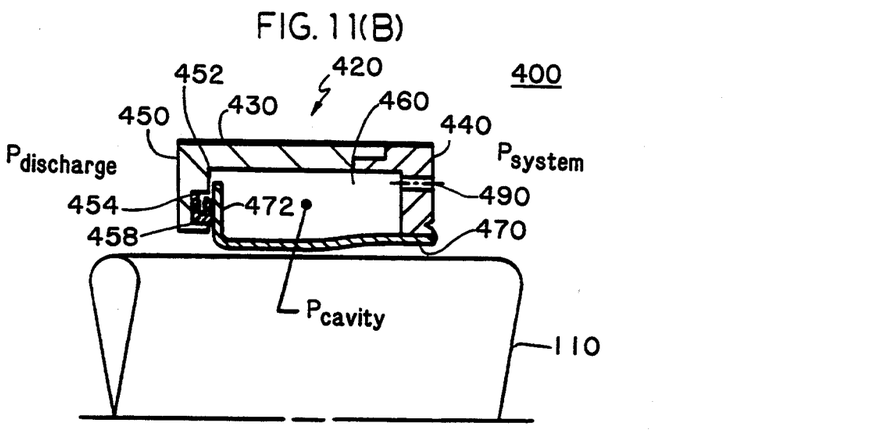

A fourth embodiment of the invention will now be described with reference to FIGS. 11(A) and 11(B). As shown in FIG. 11(A), a compliant seal device 400 is provided comprising a base member 420, the base member 420 including an annular base wall 430, a first wall 440 extending radially inward from the base wall 430 proximate a system pressure Psystem, and a second wall 450 extending radially inward from the base wall 430 proximate a discharge pressure Pdischarge. The base member 420 further includes a cavity 460 formed therein between the first wall 440 and the second wall 450.

The compliant seal device 400 further comprises a plurality of flexible sheet members 470 extending between the first wall 440 and the second wall 450. Each of the plurality of flexible sheet members 470 has a base end fixed to the first wall 440 and flange 472 in sealing engagement with the second wall 450 to substantially enclose the cavity 460 with an adjustable pressure Pcavity therein. As in the first embodiment, the cavity pressure Pcavity can be fine tuned by the use of a through port 490 in communication with the cavity 460 and the system pressure Psystem, or a through port (not shown) in communication with the cavity 460 and the discharge pressure Pdischarge.

Preferably, the compliant seal device 400 is the same as the compliant seal device 100 of FIG. 2 except that the inner surface 452 of the second wall 450 includes a secondary sealing element. For example, as shown in FIG. 11(A), the secondary sealing element can include an O-ring 456 contained within a recess 454 formed in the inner surface 452 of the second wall 450. Similarly, as shown in FIG. 11(B), the secondary sealing element can include a spring energized TEFLON seal 458 contained within the recess 454 formed in the inner surface 452 of the second wall 450. It should be understood that other secondary sealing elements can be used as is known in the art. It should be appreciated that with this design, the friction forces between the second wall 450 and the flanges 472 can be reduced.

A seal according to any of the foregoing embodiments shows improved sealing compared to both prior labyrinth seals and compliant seals. In addition, the present invention provides for improved hydrostatic and hydrodynamic force balancing, thereby minimizing rotordynamic excitation effects by transmitting minimum radial force to the shaft. Still further, once a nominal force balance is achieved, the present invention allow for a very high frequency force balance response.

Additional advantages and modifications will readily occur to those skilled in the art. For example, although the foregoing embodiments have been described with respect to an annularly shaped seal, the teachings of the present invention can also be applied toward linear seals. Further, the teachings of the present invention can be applied toward co-rotating, counter rotating, and static sealing applications.

Figure 12A:
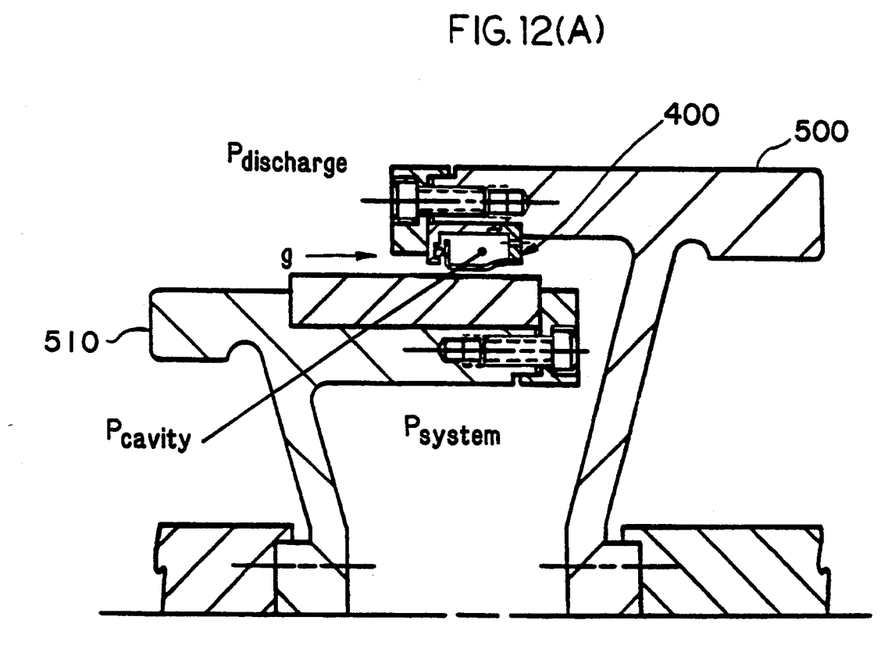
FIGS. 12(A) and 12(B) are side views of half of a co-rotating or a counter rotating apparatus incorporating the compliant seal device of FIG. 11(A)
Figure 12B:
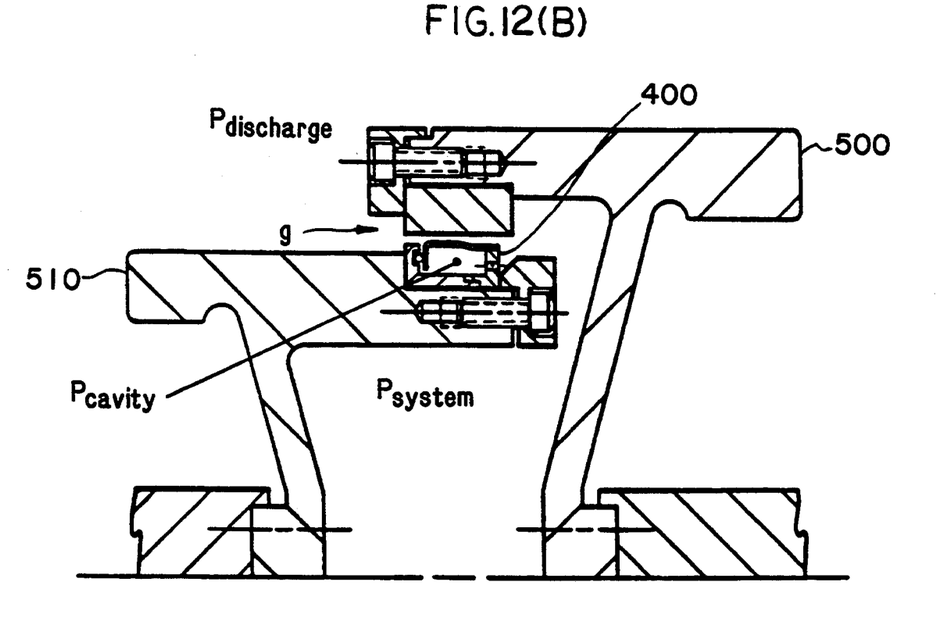

With respect to co-rotating and counter rotating sealing applications, it is contemplated that any of the compliant seal devices described thus far can be used to seal to a high pressure area from a low pressure along a gap between two co-rotating or two counter rotating members. For example, as shown in FIG. 12(A), the compliant seal device 400 of FIG. 11(A) can be provided for sealing a system pressure Psystem from a discharge pressure Pdischarge along a gap g between a first rotating member 500 and a second rotating member 510. The first rotating member 500 and the second rotating member 510 can comprise, for example, outer and inner rotors, respectively, of a co-rotating or a counter rotating aircraft engine. Further, the first and second rotating members 500 and 510 can rotate at either different speeds or at the same speed. In a co-rotating engine, the first and second rotating members 500 and 510 rotate in the same direction relative to one another, whereas in a counter rotating engine, the first and second rotating members 500 and 510 rotate in opposite directions relative to one another. Such co-rotating and counter rotating engines are manufactured by, for example, Pratt & Witney and General Electric. Although FIG. 12(A) shows the compliant seal device 400 mounted on the first rotating member 500, the compliant seal device 400 can be mounted on the second rotating member 510 as shown in FIG. 12(B).

Figure 13:
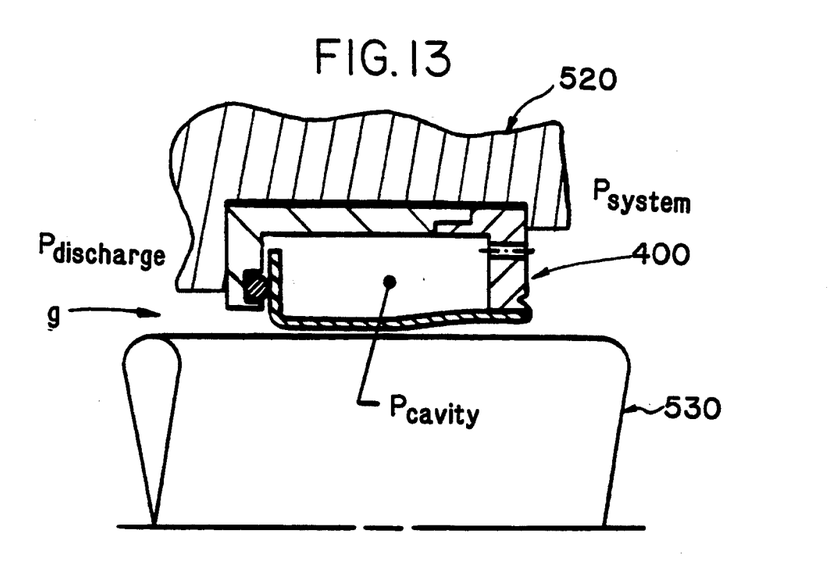
FIG. 13 is a side view of half of a static apparatus incorporating the compliant seal device of FIG. 11(A).

With respect to static sealing applications, it is contemplated that any of the compliant seal devices described thus far can be used to seal a high pressure area from a low pressure along a gap between two stationary members. For example, as shown in FIG. 13, the compliant seal device 400 of FIG. 11(A) can be provided for sealing a system pressure Psystem from a discharge pressure Pdischarge along a gap g between a first stationary member 520 and a second stationary member 530. The first stationary member 520 and the second stationary member 530 can comprise, for example, a metallic casing and a ceramic nozzle, respectively, of an aircraft engine or steam turbine. Generally, the two members will typically have different thermal coefficients and thus experience different degrees of radial thermal expansion during operation. By providing the compliant seal device 400 in the manner shown in FIG. 13, the compliant seal device 400 can compensate for differential thermal expansion between the first and second stationary members 520 and 530.

Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A compliant seal device for sealing a high pressure area from a low pressure area, the compliant seal device comprising:

a base member including a base wall, a first wall extending from the base wall proximate the high pressure area and a second wall extending from the base wall proximate the low pressure area, the base member having a cavity formed therein between the first wall and the second wall; and a flexible sheet member extending between the first wall and the second wall, the flexible sheet member having a base end fixed to the first wall and a moveable free end in sealing engagement with the second wall to substantially enclose the cavity with an adjustable pressure therein.

2. The compliant seal device of claim 1, wherein the free end of the sheet member includes a flange for sealing engagement with an inner surface of the second wall.

3. The compliant seal device of claim 2, wherein a lubricant is provided between the flange and the inner surface of the second wall.

4. The compliant seal device of claim 2, wherein the inner surface of the second wall includes a dam member protruding therefrom, the dam member defining a space between the flange and the inner surface of the second wall to maintain a pressure balance on opposite sides of the flange.

5. The compliant seal device of claim 4, wherein an inner surface of the dam member is angled for selective engagement with the flange as the free end of the sheet member is moved.

6. The compliant seal device of claim 2, wherein the inner surface of the second wall includes a secondary sealing element for sealing engagement with the flange.

7. The compliant seal device of claim 6, wherein the secondary sealing element includes any one of an O-ring and a spring-energized compound seal contained within a recess formed in the inner surface of the second wall.

8. The compliant seal device of claim 1, further comprising a through port in communication with the cavity and the high pressure area for adjusting the pressure within the cavity.

9. The compliant seal device of claim 1, further comprising a through port in communication with the cavity and the low pressure area for adjusting the pressure within the cavity.

10. The compliant seal device of claim 1, wherein the pressure within the cavity is about 80–90 percent of a pressure within the high pressure area.

11. The compliant seal device of claim 1, wherein the flexible sheet member has an upper side proximate the cavity and a lower side opposite the upper side, the lower side of the flexible sheet member having a recess formed therein.

12. The compliant seal device of claim 11, wherein the recess comprises any one of an open Rayleigh pad, a closed Rayleigh pad, a shrouded Rayleigh pad, a radial groove, and a spiral groove.

13. The compliant seal device of claim 1, wherein the flexible sheet member has an elongated axis in an axial direction and wherein the elongated axis is angled with respect to a central axis of the compliant seal device.

14. The compliant seal device of claim 1, wherein the flexible sheet member has a bend in a direction towards the cavity.

15. A compliant seal device for sealing a high pressure area from a low pressure area, the compliant seal device comprising:

a base member including an annular base wall, a first wall extending radially inward from the base wall proximate the high pressure area and a second wall extending radially inward from the base wall proximate the low pressure area, the base member having a cavity formed therein between the first wall and the second wall; and a plurality of flexible sheet members extending between the first wall and the second wall, each of the plurality of flexible sheet members having a base end fixed to the first wall and a moveable free end in sealing engagement with the second wall to substantially enclose the cavity with an adjustable pressure therein.

16. The compliant seal device of claim 15, wherein the free end of each of the plurality of sheet members includes a flange for sealing engagement with an inner surface of the second wall.

17. The compliant seal device of claim 16, wherein a lubricant is provided between each of the flanges and the inner surface of the second wall.

18. The compliant seal device of claim 16, wherein the inner surface of the second wall includes a dam member protruding therefrom, the dam member defining a space between the flanges and the inner surface of the second wall to maintain a pressure balance on opposite sides of the flanges.

19. The compliant seal device of claim 18, wherein an inner surface of the dam member is angled for selective engagement with each of the flanges as the free ends of the plurality of sheet members are moved.

20. The compliant seal device of claim 16, wherein the inner surface of the second wall includes a secondary sealing element for sealing engagement with the flanges.

21. The compliant seal device of claim 20, wherein the secondary sealing element includes any one of an O-ring and a spring-energized compound seal contained within a recess formed in the inner surface of the second wall.

22. The compliant seal device of claim 15, further comprising a through port in communication with the cavity and the high pressure area for adjusting the pressure within the cavity.

23. The compliant seal device of claim 15, further comprising a through port in communication with the cavity and the low pressure area for adjusting the pressure within the cavity.

24. The compliant seal device of claim 15, wherein the pressure within the cavity is about 80–90 percent of a pressure within the high pressure area.

25. The compliant seal device of claim 15, wherein each of the flexible sheet members has an upper side proximate the cavity and a lower side opposite the upper side, the lower side of each of the flexible sheet members having a recess formed therein.

26. The compliant seal device of claim 25, wherein the recess comprises any one of an open Rayleigh pad, a closed Rayleigh pad, a shrouded Rayleigh pad, a radial groove, and a spiral groove.

27. The compliant seal device of claim 15, wherein the flexible sheet members have an elongated axis in an axial direction and wherein the elongated axis is angled with respect to a central axis of the compliant seal device.

28. The compliant seal device of claim 15, wherein the plurality of sheet members are circumferentially spaced from each other, and further wherein a gap cover is attached to the first wall radially outside of the sheet members to cover the circumferential spaces between the sheet members.

29. The compliant seal device of claim 15, wherein each of the flexible sheet members has a bend in a direction towards the cavity.

30. An apparatus having a high pressure area and a low pressure area, the apparatus comprising:
a rotatable shaft; and
a compliant seal device for sealing the high pressure area from the low pressure area along the rotatable shaft, the compliant seal device including
a base member including an annular base wall, a first wall extending radially inward from the base wall proximate the high pressure area and a second wall extending radially inward from the base wall proximate the low pressure area, the base member having a cavity formed therein between the first wall and the second wall; and
a plurality of flexible sheet members extending between the first wall and the second wall, each of the plurality of flexible sheet members having a base end fixed to the first wall and a moveable free end in sealing engagement with the second wall to substantially enclose the cavity with an adjustable pressure therein.

31. The apparatus of claim 30, wherein each of the plurality of flexible sheet members incudes lifting means, responsive to rotation of the shaft, for lifting the flexible sheet member away from the shaft.

32. The compliant seal device of claim 31, wherein each of the flexible sheet members has an upper side proximate the cavity and a lower side opposite the upper side, and wherein the means for lifting the flexible sheet member includes a recess formed on the lower side of the flexible sheet member.

33. The compliant seal device of claim 32, wherein the recess comprises any one of an open Rayleigh pad, a closed Rayleigh pad, a shrouded Rayleigh pad, a radial groove, and a spiral groove.

34. The compliant seal device of claim 30, wherein each of the flexible sheet members has a bend in a direction towards the cavity.

35. An apparatus having a high pressure area and a low pressure area, the apparatus comprising:
a first stationary member;
a second stationary member; and
a compliant seal device for sealing the high pressure area from the low pressure area along a gap between the first stationary member and the second stationary member, the compliant seal device including
a base member including an annular base wall, a first wall extending radially inward from the base wall proximate the high pressure area and a second wall extending radially inward from the base wall proximate the low pressure area, the base member having a cavity formed therein between the first wall and the second wall; and
a plurality of flexible sheet members extending between the first wall and the second wall, each of the plurality of flexible sheet members having a base end fixed to the first wall and a moveable free end in sealing engagement with the second wall to substantially enclose the cavity with an adjustable pressure therein.

36. An apparatus having a high pressure area and a low pressure area, the apparatus comprising:
a first rotating member;
a second rotating member; and
a compliant seal device for sealing the high pressure area from the low pressure area along a gap between the first rotating member and the second rotating member, the compliant seal device including
a base member including an annular base wall, a first wall extending radially inward from the base wall proximate the high pressure area and a second wall extending radially inward from the base wall proximate the low pressure area, the base member having a cavity formed therein between the first wall and the second wall; and
a plurality of flexible sheet members extending between the first wall and the second wall, each of the plurality of flexible sheet members having a base end fixed to the first wall and a moveable free end in sealing engagement with the second wall to substantially enclose the cavity with an adjustable pressure therein.

37. The apparatus of claim 36, wherein the first rotating member rotates in a first direction and the second rotating member rotates in a second direction opposite the first direction.

38. The apparatus of claim 36, wherein the first rotating member and the second rotating member rotate in a first direction.

* * * * *

UNITED STATES PATENT AND TRADEMARK OFFICE
CERTIFICATE OF CORRECTION

PATENT NO. : 5,370,402

DATED : December 6, 1994

INVENTOR(S) : James F. GARDNER et al.

It is certified that error appears in the above-identified patent and that said Letters Patent is hereby corrected as shown below:

On the title page: Item [73] after "Assignee: EG&G Sealol, Inc.,", change "Granston, R.I." to --Cranston, R.I.--.

Signed and Sealed this

Twenty-first Day of February, 1995

Attest:

BRUCE LEHMAN

Attesting Officer Commissioner of Patents and Trademarks